United States Patent
Malcolm et al.

(10) Patent No.: US 6,684,341 B1
(45) Date of Patent: Jan. 27, 2004

(54) METHOD OF ALTERING THE APPEARANCE OF AN ICON OF A PROGRAM TO PROVIDE AN INDICATION TO A USER THAT A POWER MANAGEMENT IS ASSOCIATED WITH THE PARTICULAR PROGRAM

(75) Inventors: Jerry Walter Malcolm, Austin, TX (US); Allen Chester Wynn, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,194

(22) Filed: Mar. 9, 2000

(51) Int. Cl.⁷ ............................. G06F 1/32; G06F 11/30
(52) U.S. Cl. ................... 713/320; 713/321; 713/340
(58) Field of Search ................... 713/320, 322, 713/501, 321, 340, 300

(56) References Cited

U.S. PATENT DOCUMENTS

| | | | |
|---|---|---|---|
| 5,230,074 A | 7/1993 | Canova, Jr. et al. | 395/750 |
| 5,239,652 A | 8/1993 | Seibert et al. | 395/750 |
| 5,339,445 A | 8/1994 | Gasztonyi | 395/750 |
| 5,396,635 A | 3/1995 | Fung | 395/800 |
| 5,428,790 A | 6/1995 | Harper et al. | 395/750 |
| 5,532,935 A | 7/1996 | Ninomiya et al. | 364/492 |
| 5,560,022 A | 9/1996 | Dunstan et al. | 395/750 |
| 5,560,024 A | 9/1996 | Harper et al. | 395/750 |
| 5,600,228 A | 2/1997 | Matsubayashi et al. | 320/43 |
| 5,623,647 A * | 4/1997 | Maitra | 713/501 |
| 5,694,607 A | 12/1997 | Dunstan et al. | 395/750 |
| 5,887,179 A | 3/1999 | Halahmi et al. | 395/750.06 |
| 5,915,120 A | 6/1999 | Wada et al. | 395/750.02 |
| 5,983,357 A | 11/1999 | Sun | 713/324 |
| 6,278,421 B1 * | 8/2001 | Ishida et al. | 345/63 |
| 6,298,448 B1 * | 10/2001 | Shaffer et al. | 713/322 |
| 6,442,699 B1 * | 8/2002 | Nakajima | 713/320 |

FOREIGN PATENT DOCUMENTS

| | | | |
|---|---|---|---|
| EP | 0 666 527 A1 | 8/1995 | G06F/1/32 |
| JP | 05324418 A * | 12/1993 | G06F/11/34 |
| JP | 07-104883 | 4/1995 | G06F/1/04 |
| JP | 07-168726 | 7/1995 | G06F/9/46 |
| JP | 08-076874 | 3/1996 | G06F/1/04 |
| JP | 11-175205 | 7/1999 | G06F/1/32 |
| JP | 11-223666 | 8/1999 | G01R/31/36 |
| JP | 11-296252 | 10/1999 | G06F/1/04 |

OTHER PUBLICATIONS

Chang et al, Customization of a CISC Processor Core for Low–Power Applications, 1999 ICCD, pp. 6.*
Advanced Configuration and Power Interface Specification; Intel Microsoft Toshiba; Revision 1.0b; Feb. 2, 1999.

* cited by examiner

*Primary Examiner*—Dennis M. Butler
*Assistant Examiner*—Suresh K Suryawanski
(74) *Attorney, Agent, or Firm*—Duke W. Yee; Marilyn Smith Dawkins; Cathrine K. Kinslow

(57) ABSTRACT

A method, apparatus, and computer implemented instructions in a data processing system for managing processor power usage. Current processor utilization is compared to current processor spaced to form a comparison. Current processor speed is decreased in response to current processor speed being greater then the current processor utilization. Current processor speed is increased in response to processor speed being less than the current processor utilization in the comparison. In this manner processor speed is adjusted to meet the processor utilization. In addition, power management may be based on particular programs executing on the data processing system. A program is identified in the data processing system to form an identified program. This identified program may be one that is being initialized for execution or currently executing. Power usage is set based on the identified program. User input may be used to select particular programs for power management.

30 Claims, 3 Drawing Sheets

AUS000137US1

AUS000137US1

AUS000137US1

AUS000137US1

METHOD OF ALTERING THE APPEARANCE OF AN ICON OF A PROGRAM TO PROVIDE AN INDICATION TO A USER THAT A POWER MANAGEMENT IS ASSOCIATED WITH THE PARTICULAR PROGRAM

CROSS REFERENCE TO RELATED APPLICATIONS

The present invention is related to applications entitled COMPUTER POWER MANAGEMENT IN DATA PROCESSING SYSTEM BASED ON REQUIRED BATTERY LIFE, Ser. No. 09/522,196, which is filed even date hereof, assigned to the same assignee, and incorporated herein by reference.

BACKGROUND OF THE INVENTION

1. Technical Field

The present invention related generally to an improved data processing system and in particular to a method, apparatus, and computer implemented instructions for managing power resources in a data processing system. Still more particularly, the present invention provides a method, apparatus, and computer implemented instructions for power management in a data processing system based on processor utilization.

2. Description of Related Art

Computers have become pervasive in today's society. Computers have become commonplace at work, at school, and at home. At work, computers are used for various tasks, such as word processing, spreadsheet generation, and presentations. In addition to workstations and personal computers, mobile computers, such as notebook computers and palmtop computers, are commonly used by users traveling from one place to another. Notebook computers often take the place of a desktop computer and allow a user to take work on trips, such as trips to customer sites. Notebook computers also are used as a means to allow a user to communicate with the office and exchange documents and other data while the user is outside of the office.

These mobile computers are powered by finite power sources, such as lithium batteries. Power management programs and systems allow the user to control power consumption in a mobile computer. Typically, more power is consumed with faster processor speeds. Additionally, more power is consumed as more devices are active on a mobile computer.

Presently, a user is able to optimize battery life by selecting a lower performance and lower power usage mode for a processor. The present invention recognizes that this approach does not take into the dynamic nature of a typical user's usage of a computer. For example, a programmer spends a period of time editing a source file. Thereafter, the programmer compiles the program. Then, editing and debugging of the program occurs. This phase is typically accomplished using an interactive debug program with the user stepping through the compiled program using the debug program.

Editing a source file and editing and debugging a program does not require large amounts of processor resources, such as high processor speeds. A user perceives no performance degradation while typing characters even if the processor is slowed to the slowest possible speed for the processor.

On the other hand, compiling a program requires larger amounts of processor resources than typing characters on a computer. The processor speed may affect the compile time by minutes, depending on the amount of code compiled. With presently available approaches, a user is forced to choose between slow compile times and longer battery life versus fast compile times and shorter battery life, resulting from running the processor unnecessarily at high speeds when editing a file.

Therefore, it would be advantageous to have an improved method and apparatus for managing power usage in a computer based on processor utilization.

SUMMARY OF THE INVENTION

The present invention provides a method, apparatus, and computer implemented instructions in a data processing system for managing processor power usage. Current processor utilization is compared to current processor speed to form a comparison. Current processor speed is decreased in response to current processor speed being greater than the current processor utilization. Current processor speed is increased in response to processor speed being less than the current processor utilization in the comparison. In this manner processor speed is adjusted to meet the processor utilization. Thus, when less processor speed is needed the processor speed is lowered to reduce power usage.

In addition, power management may be based on particular programs executing on the data processing system. A program is identified in the data processing system to form an identified program. This identified program may be one that is being initialized for execution or currently executing. Power usage is set based on the identified program. User input may be used to select particular programs for power management.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
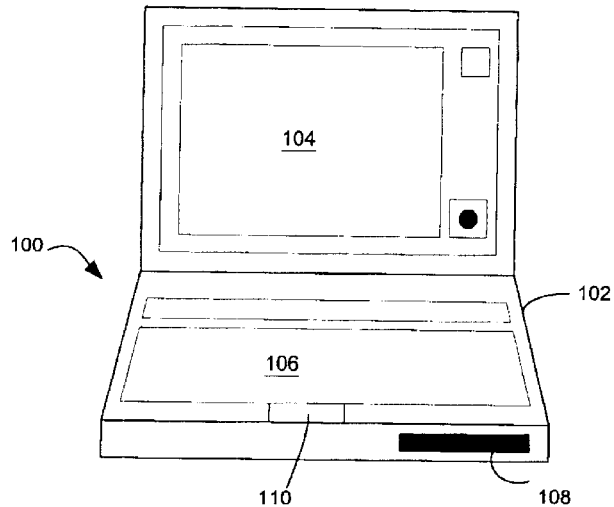
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A notebook computer 100 is depicted which includes a case 102, a display 104, a keyboard 106, storage devices 108, and a touchpad 110. Storage devices 108 may include floppy drives, hard disk drives, and other types of permanent and removable storage media. Additional input devices, in addition to or in place of touchpad 110, may be included with notebook computer 100, such as, for example, a joystick, a mouse, a touch screen, a trackball, a microphone, and the like.

Although the depicted representation shows a computer, other embodiments of the present invention may be implemented in other types of data processing systems, such as a desktop computer, a palmtop computer, or a personal digital assistant (PDA). A palmtop computer is a computer small enough to hold in one hand and operate with the other. Palmtops may have specialized keyboards or keypads for data entry applications or have small qwerty keyboards. A PDA is a handheld computer that serves as an organizer for personal information. It generally includes at least a name and address database, a to-do list, and a note taker. PDAs are pen based and use a stylus to tap selections on menus and to enter printed characters. The unit may also include a small on-screen keyboard, which is tapped with the pen.

Figure 2:
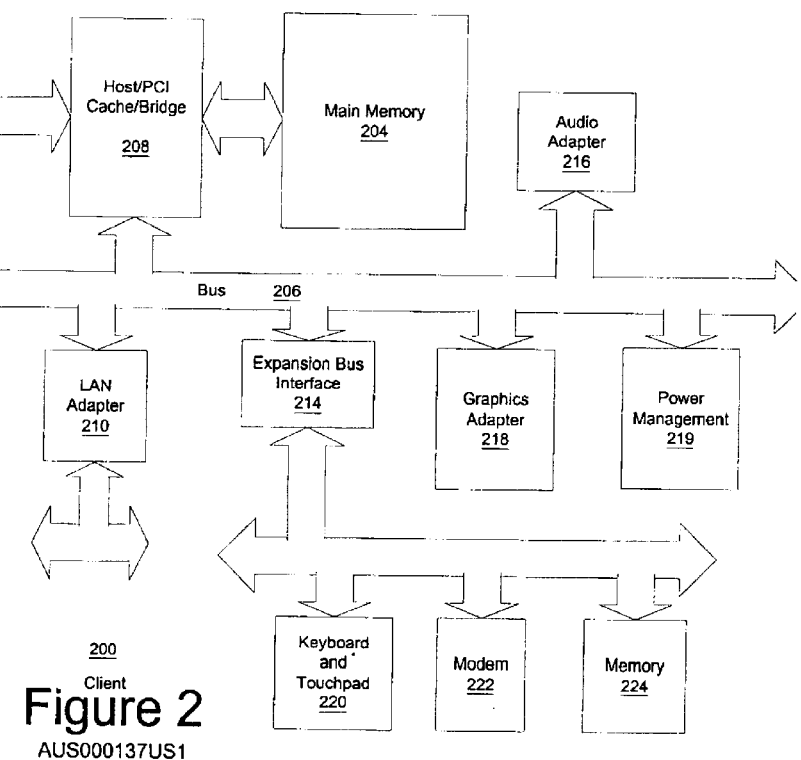
FIG. 2 is a block diagram of a data processing system shown in which the present invention may be implemented.

With reference now to FIG. 2, a block diagram of a data processing system is shown in which the present invention may be implemented. Data processing system 200 is an example of a computer, such as notebook computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and power management 219 are connected to PCI local bus 206. Expansion bus interface 214 provides a connection for a keyboard and touchpad 220, modem 222, and additional memory 224. SCSI host bus adapter 212 provides a connection for hard disk drive 226 and CD-ROM drive 228.

An operating system runs on processor 202 and is used to coordinate and provide control of various components within data processing system 200 in FIG. 2. The operating system may be a commercially available operating system, such as Windows 2000, which is available from Microsoft Corporation. Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

As a further example, data processing system 200 may be a PDA device, which is configured with ROM and/or flash ROM in order to provide non-volatile memory for storing operating system files and/or user-generated data. In these examples, data processing system 200 is powered by a battery or other portable power source.

The depicted example in FIG. 2 and above-described examples are not meant to imply architectural limitations. For example, data processing system 200 also may be a notebook computer, hand held computer, or a mobile phone, in addition to taking the form of a PDA.

The processes of the present invention are performed by processor 202 using computer implemented instructions, which may be located in a memory such as, for example, main memory 204, memory 224, or in one or more peripheral devices 226–228. Furthermore, the processes of the present invention may be implemented with power management 219. Power management 219 may include, for example, registers, Basic Input Output System (BIOS), and tables used to perform power control management on hardware in data processing system 200. Power management functions and processes also may be implemented in an operating system on data processing system 200.

The present invention provides a method, apparatus, and computer implemented instructions for managing power consumption in a data processing system to maximize performance while maintaining power resources sufficient to run the data processing system based on utilization of resources within the data processing system. In the depicted examples, the resource adjustment is made with respect to processor speed for one or more processors located in the data processing system. The resource usage that is monitored for by the mechanism of the present invention is based on the execution or running of applications or programs in the data processing system.

Depending on the implementation, the mechanism of the present invention may automatically adjust the speed of the processor based on processor utilization. Typically, a user desires to have increased processor speed when a processor intensive application is executing on the data processing system. The mechanism of the present invention increases the processor speed when more processor resources are being consumed. When that application finishes, the mechanism of the present invention reduces the processor speed in order to reduce the amount of power consumed in the data processing system.

Alternatively, a user also may set processor speeds for various programs. This setting of processor speeds may be accomplished by different mechanisms. For example, a user may place an icon representing an application into a folder. Each application associated with an icon located in the folder will cause the data processing system to set the processor speed to some preselected speed when those applications are executed. Additionally, the user may select applications, which are associated with the processor speed without having to place the icons for the applications in a particular folder. Such applications may be identified in a graphical user interface based on some graphical indicator, such as, for example, a change in color of the text in the icon, a change in font type for the text, or some change in appearance in the icon itself. Further, entire sets of programs or subdirectories of applications may be associated in such a manner. The user may set the speed for a set of applications by selecting a processor speed. This processor speed may take various forms, such as, for example, a clock speed or percentage of full speed for the processor.

Figure 3:
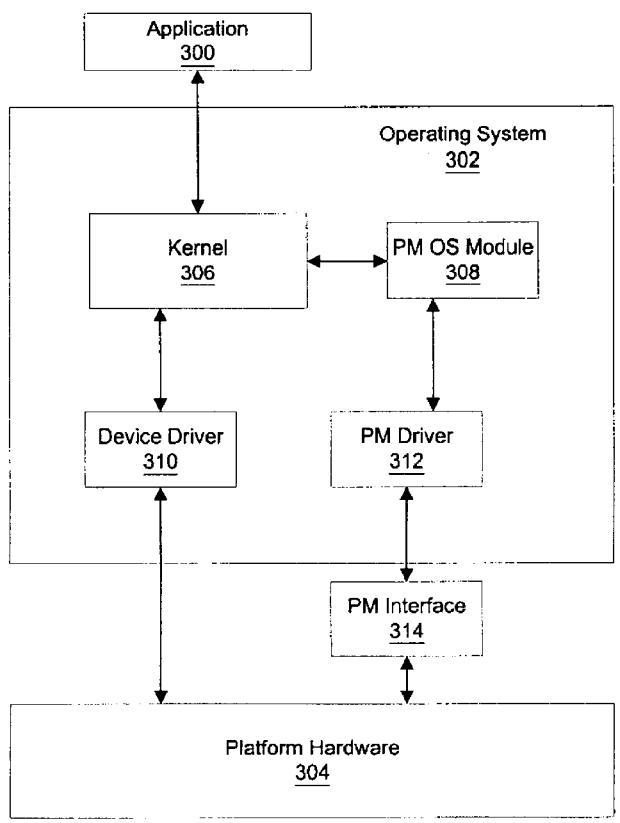
FIG. 3 is a diagram of components used in power management based on a required battery life in accordance with a preferred embodiment of the present invention.

With reference now to FIG. 3, a diagram of components used in power management based on a required battery life is depicted in accordance with a preferred embodiment of the present invention. In this example, a user may use application 300, which interacts with operating system 302 and platform hardware 304. Operating system 302 includes a kernel 306, a power management (PM) operating system (OS) module 308, a device driver 310, and a power management driver 312. Kernel 306 is a part of operating system 302, resides in memory at all times, and provides the basic services. Kernel 306 is the part of operating system 302 that is closest to the platform hardware 304 and may activate the hardware directly or interface to another software layer, such as device driver 310, which drives the hardware.

PM OS module 308 provides processes for use in power management of a data processing system. This module may provide a user interface to allow a user to change various power management features, such as, for example, processor speed, sleep times, and display intensity. Additionally, PM OS module 308 also may provide information to the user, such as a display of present power settings and available battery life.

Power management driver 312 interacts with power management interface 314 to provide control of platform hardware 304. Power management interface 314 may be implemented as power management 219 in FIG. 2. This interface may be implemented using a number of different standards. For example, this interface may be implemented using the Advanced Configuration and Power Interface (ACPI) Specification. This specification provides for various power management functions, such as enabling computers to come on instantly when accessed by a user and to remain available to perform automated tasks after they are turned off. This specification sets forth a register-level interface to core power management functions and a descriptive interface for additional system specific hardware features. ACPI is compatible presently with existing power management and configuration interfaces, while providing processor architecture and operating system-independent implementation. More information may be found on ACPI may be found in the Advanced Configuration and Power Interface Specification, which is found at http://www.teleport.com/~acpi/.

In the depicted example, PM OS module 308 may implement the power management mechanism of the present invention. Alternatively, this mechanism may be implemented elsewhere, such as in application 300. The mechanism of the present invention may continually monitor processor utilization or other power usage through various calls to platform hardware 304 through PM driver 312 and PM interface 314. The mechanism of the present invention monitors the resource utilization in the data processing system and adjusts performance for various devices, such as, for example, a processor or modem, depending on the usage of the devices. Based on these factors, the mechanism of the present invention will adjust the configuration of the data processing system to allow the data processing system to operate in a manner in which performance of the data processing system is maximized to meet resource utilization.

For example, when processor utilization increases, the processor speed is increased by the mechanism of the present invention to increase performance for applications requiring processor intensive operations. These operations may include, for example, compiling a program, performing a computer aided drawing operation, or a spreadsheet calculation. Similarly, when processor utilization decreases, the processor speed is slowed down to conserve power resources. Slower speeds may be used for operations, such as user inactivity or typing of characters in a document.

The mechanism is set to optimize the performance of the data processing system, while meeting the time constraints.

In the depicted examples, the alteration in the configuration of the data processing system may take various forms, such as, for example, display intensity, processor speed, activating devices, and deactivating devices. For example, devices unused by an application may be turned off or powered down sooner or more frequently, while devices, which are extensively used by an application, are left powered for longer periods of time or all of the time. These changes in configuration are implemented through PM OS module 308 generating calls to platform hardware 304 through PM driver 312 and PM interface 314.

Figure 4:
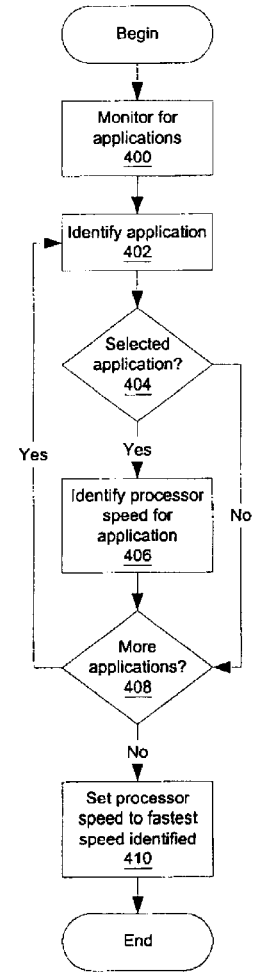
FIG. 4 is a flowchart of a process for power management based on executing applications in accordance with a preferred embodiment of the present invention.

Turning now to FIG. 4, a flowchart of a process for power management based on executing applications is depicted in accordance with a preferred embodiment of the present invention. This process is used when a user selects programs or applications for power management in a data processing system.

The process begins by monitoring for applications (step 400). Step 400 occurs in response to an event. The event may be periodic, such as one or more clock cycles. Further, the event may be in response to initiation or termination of an application. Also, the event may include changes in processor utilization. This step may be applied to monitoring for applications executing in the data processing system, monitoring for initiation of applications, or both. When an application is detected, the application is identified (step 402). A determination is made as whether the application is a selected application (step 404). This determination may be made using different mechanisms. For example, the identified application may be checked against identification of applications stored in a data structure, such as a flat file, an array, or a database.

If the application is a selected application, a processor speed is identified for the application (step 406). This processor speed may be identified or selected in a number of different ways, for example, the processor speed may be associated with the application in the data structure or all applications may be given a default or preset processor speed. A determination is then made as to whether more applications are present (step 408). If more applications are present, the process returns to step 402. Otherwise, the processor speed is set to the fastest speed identified for all of the currently executing or initialized applications (step 410) with the process terminating thereafter. The processor speed may be adjusted in a number of ways. Typically, the clock for the processor is controlled. Presently available processors, such as those from Intel Corporation, provide registers or other controls, which may be used to control the processor clock logic for the processor. More details may be found in the Advanced Configuration and Power Interface Specification.

With reference again to step 404, if the application is not identified as a selected application in which power management is to be performed, the process proceeds to step 408 as described above.

Figure 5:
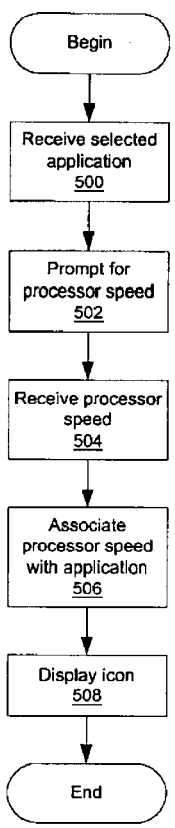
FIG. 5 is a flowchart of a process for selecting applications for power management in accordance with a preferred embodiment of the present invention.

With reference now to FIG. 5, a flowchart of a process for selecting applications for power management is depicted in accordance with a preferred embodiment of the present invention. The process in FIG. 5 is implemented using a graphical user interface to facilitate user input and display of information to the user in these examples. The process begins by receiving selection of an application for power management (step 500). This step may be accomplished using a number of different mechanisms. For example, the input may be received by the user inputting the name of the applications, selecting the application from a list of applications, or graphically placing the application in a selected folder or area in the graphical user interface.

The process then prompts the user to select a processor speed (step 502). The processor speed is received (step 504). The receipt of the processor speed may be accomplished using a number of different user input mechanisms. For examples, the user may input a processor speed, select a speed from a number of selections, or select a speed using a graphical control, such as a dial, scroll bar, or button. The selected speed is associated with the application (step 506). This association may be accomplished by storing the selected speed with the identification of the application in a data structure. Next, the icon for the data structure is displayed with an indication that power management has been selected for the application (step 508) with the process terminating thereafter. This display may take various forms, such as, for example, display of an icon in a selected folder, altering the graphical format of the text displayed with the icon, or altering the icon to include some graphical identifier to indicate power management.

Figure 6:
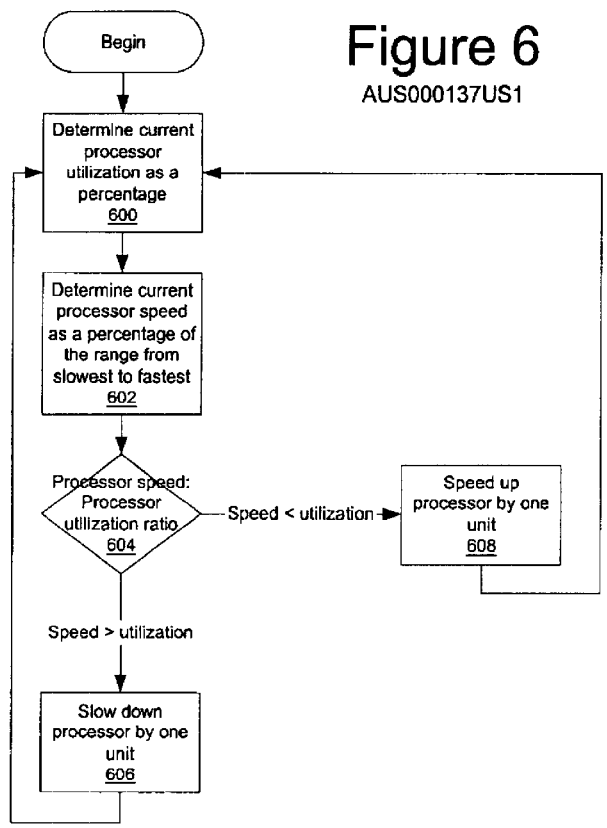
FIG. 6 is a flowchart of a process for automatically providing computer power management based on processor utilization in accordance with a preferred embodiment of the present invention.

Further, the mechanism of the present invention may provide power management without requiring user input. With reference now to FIG. 6, a flowchart of a process for automatically providing computer power management based on processor utilization is depicted in accordance with a preferred embodiment of the present invention. The processes illustrated in FIG. 6 are initiated in response to an event, such as, for example, a periodic event or an event causing changes in processor utilization.

The process begins by determining the current processor utilization as a percentage (step 600). In these examples, processor utilization is from 0 precent to 100 precent. Next, the current processor speed is determined as a percentage of the range a slowest speed to a fastest speed for the processor (step 602). The processor speed is assigned 0 precent for the slowest speed and 100 precent for the fastest speed.

A comparison is made as to the processors speed to determine the processor utilization ratio (step 604). This comparison is made between the percentages of the current processor utilization and the current processor speed. In the depicted examples, a one to one ratio is selected. In this example, the process maintains a one to one ratio in which the percentages are kept the same. For example, if the processor utilization is 75 precent, the processor speed should be 75 precent of the maximum processor speed. Of course, many different ratios and types of mechanisms may be used to compare processor utilization and processor speed.

If the processor speed is less than the processor utilization, the processor speed is increased by one unit (step 608) with the process then returning to step 600. In these examples, a "unit" is a smallest increment in granularity allowed in adjusting a particular processor. Of course, other steps equal or unequal may be made depending on the implementation. Processor speed in these examples refers to a percentage, but may also be expressed in other ways, such as in clock cycles.

If, on the other hand, the processor speed is greater than the processor utilization, the processor speed is slowed down by one unit (step 606) with the process then returning to step 600.

Additionally, the processes described above also may take into account spikes in processor usage and prevent such spikes from affecting the adjustments in resource usage, such as processor speed. For example, loading a program may briefly cause a spike in the use of resources. The program itself may not use large amounts of resources. The processes may take into account situations like program loading in which a short spike in usage occurs and ignores those spike in making adjustments. Such a mechanism may include mechanisms, such as providing a lag time before adjusting the resources to make sure that the change in usage is not merely a spike or temporary situation.

Thus, the present invention provides an improved method, apparatus, and computer implemented instructions for power management in a data processing system. The mechanism of the present invention provides the highest amount of performance needed from the data processing system, while reducing power consumption on a dynamic basis. In the depicted examples, processor speed of a processor is the parameter adjusted to provide performance while reducing power consumption. The user may select applications for power management or alternatively, the mechanism of the present invention may monitor resource usage in the data processing system. With allowing user selection, the user may select programs that do not require high processor speed such that processor speed is lowered when these programs are being executed by the processor. The user may select programs requiring higher processor speeds so that higher performance is provided when needed. Also, the user may make selections that would provide increased processor power to applications even if the applications are not processor intensive.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The mechanism of the present invention may be applied to power management of devices other than a processor in a data processing system. For example, these processors may be applied to other devices, such as storage devices and communications devices. With a storage devices, such as a hard drive, applications requiring hard drive access may cause the data processing system to disable a time out or increase the time out before a hard disk drive is powered down. These actions serve to reduce the performance hit caused by having to power up the hard disk drive. Also, the processes may be applied to a monitor or liquid crystal display (LCD) screen. With a LCD screen, the brightness may be adjusted to change power resource usage. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method operable in a data processing system, the method comprising:

receiving user input, wherein the user input designates that at least one program has special power consumption-related requirements and wherein the user input is entered through a graphical user interface by modifying the appearance of at least one graphical feature representing the at least one program;

in response to receiving the user input, storing data in a data structure, wherein the data structure represents a set of programs having special power consumption-related requirements and wherein storing the data in the data structure causes the data structure to indicate that the at least one program is a member of the set of programs having special power consumption-related requirements; and in response to a particular program from the set of programs having special power consumption-related requirements being executed, adjusting power consumption in the data processing system to comply with the special power consumption-related requirements of the particular program.

2. The method of claim 1, wherein adjusting power consumption in the data processing system includes modifying a speed of a processor in the data processing system.

3. The method of claim 1, wherein adjusting power consumption in the data processing system includes adjusting a display intensity.

4. The method of claim 1, wherein adjusting power consumption in the data processing system includes enabling a component of the data processing system, wherein the component.

5. The method of claim 1, wherein adjusting power consumption in the data processing system includes disabling a component of the data processing system.

6. The method of claim 1, wherein the user input includes an instruction to insert the at least one program into a folder.

7. The method of claim 6, further comprising:

receiving additional user input, wherein the additional user input specifies particular power consumption-related requirements for a program in the set of programs having special power consumption requirements.

8. The method of claim 7, wherein the particular power consumption requirements includes a processor speed requirement.

9. The method of claim 1, wherein the at least one graphical feature includes at least one icon.

10. A computer program product in a computer-readable medium, the computer program product comprising instructions that, when executed by a computer, cause the computer to perform acts that include:

receiving user input, wherein the user input designates that at least one program has special power consumption-related requirements and wherein the user input is entered through a graphical user interface by modifying the appearance of at least one graphical feature representing the at least one program;

in response to receiving the user input, storing data in a data structure, wherein the data structure represents a set of programs having special power consumption-related requirements and wherein storing the data in the data structure causes the data structure to indicate that the at least one program is a member of the set of programs having special power consumption-related requirements; and in response to a particular program from the set of programs having special power consumption-related requirements being executed, adjusting power consumption in the data processing system to comply with the special power consumption-related requirements of the particular program.

11. The computer program product of claim 10, wherein adjusting power consumption in the data processing system includes modifying a speed of a processor in the data processing system.

12. The computer program product of claim 10, wherein adjusting power consumption in the data processing system includes adjusting a display intensity.

13. The computer program product of claim 10, wherein adjusting power consumption in the data processing system includes enabling a component of the data processing system.

14. The computer program product of claim 10, wherein adjusting power consumption in the data processing system includes disabling a component of the data processing system.

15. The computer program product of claim 10, wherein the user input includes an instruction to insert the at least one program into a folder.

16. The computer program product of claim 15, comprising additional instructions that, when executed by the computer, cause the computer to perform additional acts that include:

receiving additional user input, wherein the additional user input specifies particular power consumption-related requirements for a program in the set of programs having special power consumption requirements.

17. The computer program product of claim 16, wherein the particular power consumption requirements includes a processor speed requirement.

18. The computer program product of claim 10, wherein the at least one graphical feature includes at least one icon.

19. A data processing system comprising:

means for receiving user input, wherein the user input designates that at least one program has special power consumption-related requirements and wherein the user input is entered through a graphical user interface by modifying the appearance of at least one graphical feature representing the at least one program;

means, responsive to receiving the user input, for storing data in a data structure, wherein the data structure represents a set of programs having special power consumption-related requirements and wherein storing the data in the data structure causes the data structure to indicate that the at least one program is a member of the set of programs having special power consumption-related requirements; and means, responsive to a particular program from the set of programs having special power consumption-related requirements being executed, for adjusting power consumption in the data processing system to comply with the special power consumption-related requirements of the particular program.

20. The data processing system of claim 19, wherein adjusting power consumption in the data processing system includes modifying a speed of a processor in the data processing system.

21. The data processing system of claim 19, wherein adjusting power consumption in the data processing system includes adjusting a display intensity.

22. The data processing system of claim 19, wherein adjusting power consumption in the data processing system includes enabling a component of the data processing system.

23. The data processing system of claim 19, wherein adjusting power consumption in the data processing system includes disabling a component of the data processing system.

24. The data processing system of claim 19, wherein the user input includes an instruction to insert the at least one program into a folder.

25. The data processing system of claim 24, further comprising:

means for receiving additional user input, wherein the additional user input specifies particular power consumption-related requirements for a program in the set of programs having special power consumption requirements.

26. The data processing system of claim 25, wherein the particular power consumption requirements includes a processor speed requirement.

27. The data processing system of claim 19, wherein the at least one graphical feature includes at least one icon.

28. The method of claim 1, wherein the at least one graphical feature may be placed in a particular folder.

29. The computer program product of claim 10, wherein the at least one graphical feature may be placed in a particular folder.

30. The data processing system of claim 19, wherein the at least one graphical feature may be placed in a particular folder.

* * * * *